United States Patent [19]

Verellen

[11] Patent Number: 5,441,332
[45] Date of Patent: Aug. 15, 1995

[54] SEAT INTEGRATED VEHICLE SAFETY APPARATUS

[75] Inventor: Lawrence J. Verellen, Washington, Mich.

[73] Assignee: TRW Vehicle Safety Systems Inc., Lyndhurst, Ohio

[21] Appl. No.: 225,445

[22] Filed: Apr. 8, 1994

[51] Int. Cl.6 .............................................. B60R 22/00
[52] U.S. Cl. .................................. 297/483; 297/473; 297/475
[58] Field of Search ............... 297/468, 473, 483, 484, 297/475; 280/808

[56] References Cited

U.S. PATENT DOCUMENTS

| | | | |
|---|---|---|---|
| 3,638,999 | 2/1972 | Tischler | 297/378.11 |
| 3,877,748 | 4/1975 | Eggert | 297/483 X |
| 4,652,053 | 3/1987 | Mikami | 297/483 X |
| 4,739,673 | 4/1988 | Ishikawa et al. | |
| 4,765,651 | 8/1988 | Unger | |
| 4,895,392 | 1/1990 | Schut et al. | |
| 5,088,794 | 2/1992 | Iwami et al. | 297/483 |
| 5,125,686 | 6/1992 | Yano et al. | 297/483 X |
| 5,165,719 | 11/1992 | Yano | |
| 5,263,741 | 11/1993 | Seros et al. | 297/483 X |
| 5,330,228 | 7/1994 | Krebs et al. | 297/483 X |

FOREIGN PATENT DOCUMENTS 2810577  9/1979  Germany ........................... 297/483

Primary Examiner—Peter R. Brown
Attorney, Agent, or Firm—Tarolli, Sundheim & Covell

[57] ABSTRACT

A vehicle safety apparatus (10) includes a seat (12) for an occupant of a vehicle. A length of belt webbing (42) is extensible about the occupant of the vehicle seat to restrain the occupant. The length of belt webbing has a portion (48) extending from an upper portion (24) of the seat back (20). A belt webbing engaging member (76) is mounted on the seat back (20) for guiding movement of the belt webbing (48) from the seat back. The safety apparatus includes means (120) for mounting the belt webbing engaging member (76) on the seat back (20) for movement relative to the seat back in a direction between the seat back inboard side (28) and the seat back outboard side (26). In a preferred embodiment, the belt webbing engaging member is a seat belt retractor spool (76). The retractor spool (76) is mounted in the frame (62) of a retractor (60) for rotation about an axis (82). Shoulder belt webbing (48) is wound on the spool (76). The retractor (60) is movable relative to the seat back (20) to adjust the location from which the shoulder belt (48) extends across the torso of an occupant seated in the vehicle seat.

13 Claims, 3 Drawing Sheets

SEAT INTEGRATED VEHICLE SAFETY APPARATUS

BACKGROUND OF THE INVENTION

1. Technical Field

The present invention relates to a seat integrated vehicle safety apparatus. In particular, the present invention relates to a vehicle occupant restraint such as a seat belt retractor which is mounted on a vehicle seat for movement relative to the vehicle seat.

3. Description of the Prior Art

A seat belt system restrains movement of a vehicle occupant during sudden vehicle deceleration such as occurs in a vehicle collision. A typical seat belt system includes a length of shoulder belt webbing extensible across the torso of a vehicle occupant. The shoulder belt extends from a location above and behind the shoulder of the vehicle occupant, across the occupant's torso.

The vehicle seat may be occupied by vehicle occupants of different sizes. For optimum comfort, it is desirable to have the shoulder belt extend across a vehicle occupant's torso at a predetermined position on the torso, regardless of the size of the vehicle occupant. For different vehicle occupants, this predetermined position may be at different locations relative to the vehicle seat, depending on the size of the occupant. Accordingly, it is desirable to be able to move, relative to the vehicle seat, the location from which the shoulder belt extends across the torso of an occupant seated in the vehicle seat.

SUMMARY OF THE INVENTION

The present invention is a vehicle safety apparatus for an occupant in a seat of a vehicle. The safety apparatus includes a length of belt webbing extensible about the occupant of the seat to restrain the occupant. The safety apparatus includes a belt webbing engaging member mounted on the seat and engaging the belt webbing. The safety apparatus also includes means for mounting the belt webbing engaging member on the seat for movement relative to the seat.

In a preferred embodiment, the belt webbing engaging member is a seat belt retractor including a frame and a spool mounted in the frame for rotation in a belt retraction direction and an opposite belt withdrawal direction. The belt webbing is wound on the spool and a shoulder belt portion of the belt webbing extends from the spool. The retractor is movable horizontally relative to the seat.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT OF THE INVENTION

Figure 1:
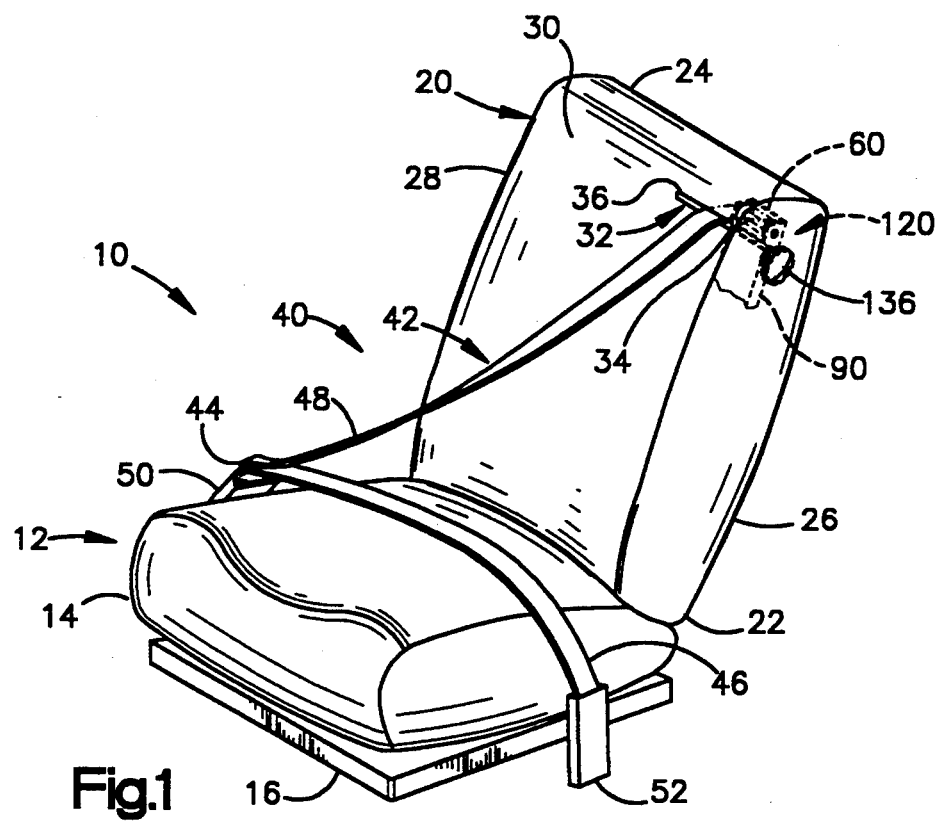
FIG. 1 is a perspective view of a vehicle safety apparatus in accordance with the present invention and showing belt webbing extending from a vehicle seat at a first location.

The present invention relates to a vehicle safety apparatus and particularly to a seat integrated vehicle occupant restraint for protecting the occupant of a vehicle. The present invention is applicable to various occupant restraint constructions. As representative of the present invention, FIG. 1 illustrates schematically a vehicle safety apparatus 10.

The safety apparatus 10 includes a seat 12 for an occupant of a vehicle. The seat 12 includes a seat bottom cushion 14 supported on a frame 16 fixed to the body of the vehicle (not shown). The seat 12 includes a seat back 20 connected with the seat bottom cushion 14. The seat back 20 has a lower portion 22 and an upper portion 24. The seat back 20 also has an outboard side 26 and an inboard side 28.

The seat back 20 includes a seat cover 30. The seat cover 30 is typically a layer of cloth or leather which covers the structural and supporting components of the seat 12. The seat back cover 30 includes surfaces defining a horizontally extending opening 32 in the seat back 20. The opening 32 has opposite ends 34 and 36. The opening 32 is preferably a slot extending through the material of the cover 30 at a location adjacent the top portion 24 of the vehicle seat back 20.

The safety apparatus 10 includes a three-point continuous loop seat belt system 40. The seat belt system 40 includes a single continuous length of belt webbing 42 which is divided by a movable tongue assembly 44 into a lap portion 46 and a shoulder portion 48. The lap portion 46 extends across the seat bottom cushion 14 and across the lap of an occupant seated in the seat 12. The shoulder portion 48 extends across the torso of an occupant seated in the-seat 12. The tongue assembly 44 is engaged with a buckle 50 anchored to the vehicle body.

One end of the length of belt webbing 42 is connected at an anchor point 52 to the seat frame or the vehicle body. The anchor point 52 is disposed adjacent a side of the seat 12 opposite the buckle 50. The opposite end of the length of belt webbing 42, i.e., the upper end of the shoulder portion 48, extends from a belt webbing engaging member 76 disposed in the seat back upper portion 24. The shoulder portion 48 extends from the belt webbing engaging member out of the upper portion 24 of the seat back 20 and in a direction toward the buckle 50. It should be understood that the present invention can be used in association with other types of seat belt systems, such as a dual retractor system.

In a preferred embodiment, the belt webbing engaging member is a spool 76 of a seat belt retractor 60. The retractor 60 (FIGS. 2 and 4) includes a retractor frame 62. The retractor frame 62 includes a back wall 64 in which a mounting opening 66 is formed. Opposed and spaced apart side walls 68 and 70 extend perpendicularly from the back wall 64. The retractor frame 62 also includes a transverse wall 72 extending between the side walls 68 and 70 and perpendicular to the back wall 64. The transverse wall 72 has a lower surface 74.

The belt webbing 42 is wound about the spool 76 of the retractor 60. The retractor spool 76 is rotatably supported in the retractor frame 62 between the side walls 68 and 70. The retractor spool 76 (FIG. 4) is rotatable in a belt retraction direction 78 and in an opposite belt withdrawal direction 80 about an axis 82. The axis 82 extends generally horizontally in a direction between the outboard side 26 and the inboard side 28 of the seat back 20.

Figure 1A:
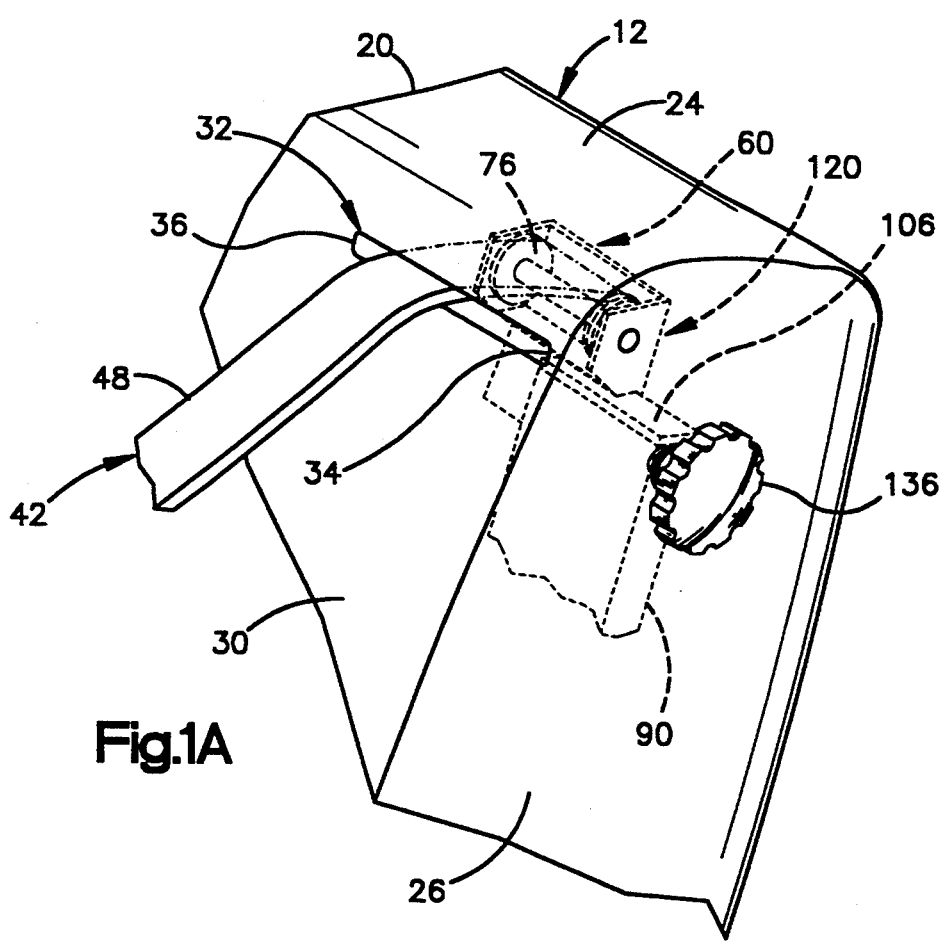
FIG. 1A is an enlarged view of a portion of the safety apparatus of FIG. 1 showing the belt webbing extending from the vehicle seat a second location.
Figure 2:
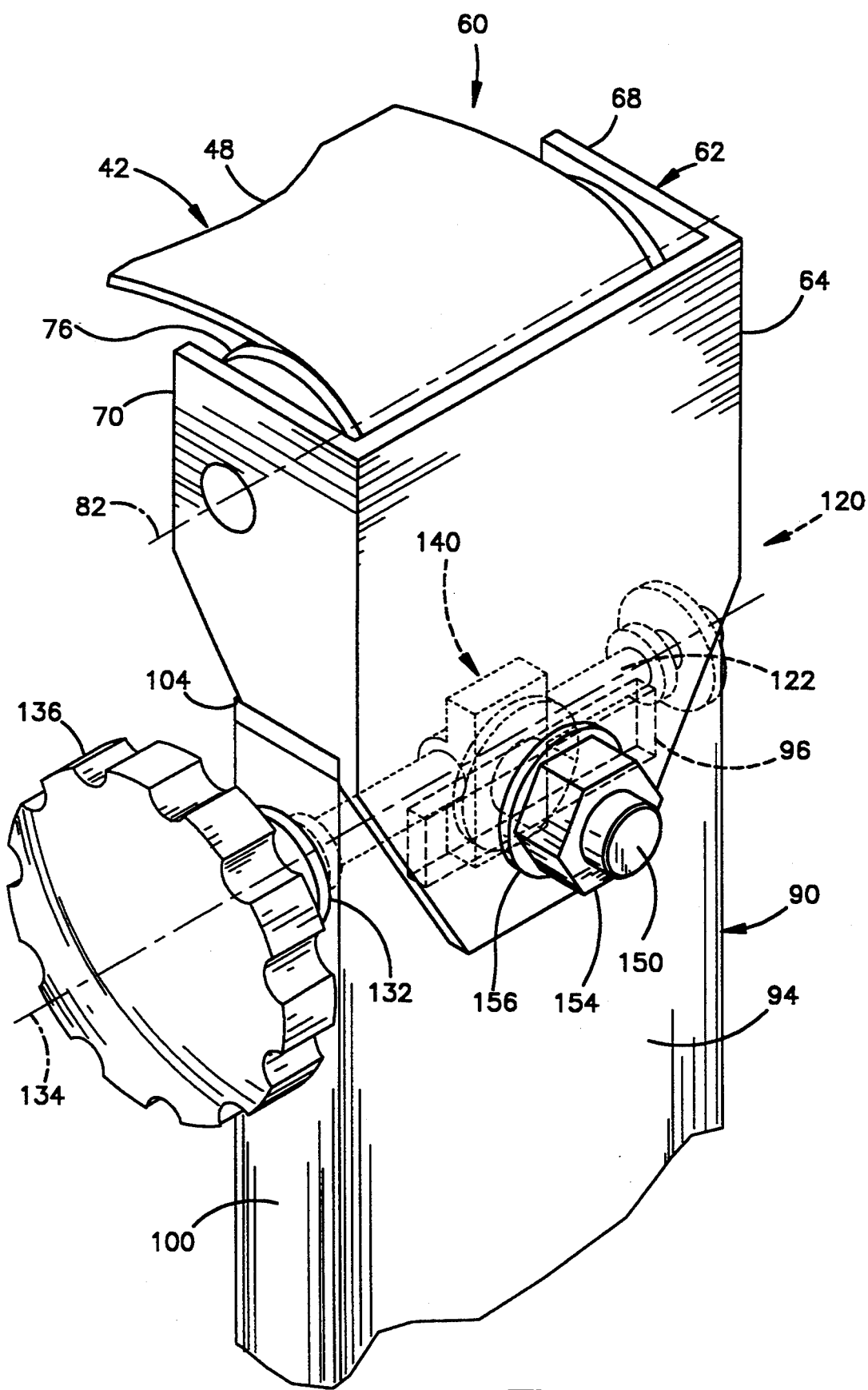
FIG. 2 is an enlarged rear perspective view of a portion of the safety apparatus of FIG. 1.

The retractor 60 is disposed inside the seat back 20, as best seen in FIGS. 1A and 2. The retractor 60 is thus disposed within the confines of the seat back cover 30 and is normally hidden from view in the vehicle. The belt webbing 42, specifically the shoulder portion 48, extends from the retractor spool 76 out of the seat back 20 through the opening 32 in the cover 30.

Figure 3:
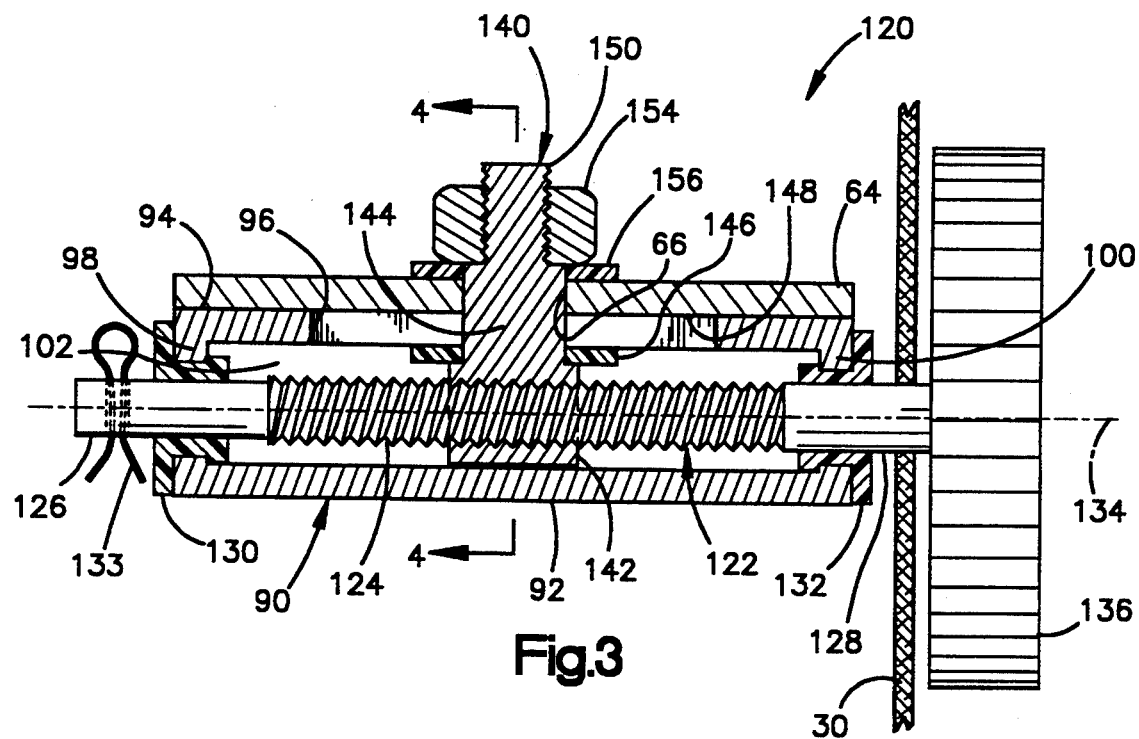
FIG. 3 is a sectional view through a portion of the apparatus of FIG. 1.
Figure 4:
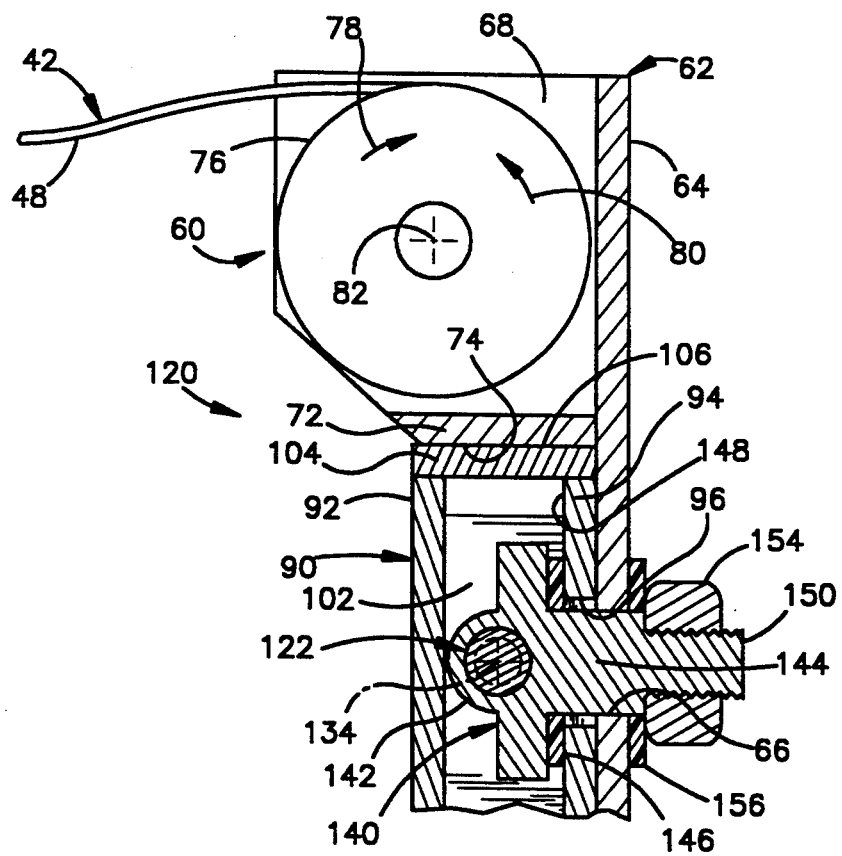
FIG. 4 is a sectional view taken along line 4—4 of FIG. 3.

The retractor 60 is supported on a seat frame member 90 (FIGS. 2-4). The seat frame member 90 is a vertically extending part of the load bearing frame structure of the seat back 20. The seat frame member 90 is preferably a tubular member with a rectangular cross-section that includes parallel front and back walls 92 and 94 and parallel side walls 98 and 100. The back wall 94 includes surfaces defining a slot 96 in the back wall extending horizontally in a direction between the side walls 98 and 100 of the seat frame member 90.

The walls 92, 94, 98, and 100 of the seat frame member 90 define within them a chamber 102 (FIGS. 3 and 4). The slot 96 opens into the chamber 102. The seat frame member 90 includes a top plate 104 which closes the top of the chamber 102. The top plate 104 has an upper surface 106 disposed in abutting engagement with the lower surface 74 of the retractor frame transverse wall 72, as best seen in FIG. 4. It should be understood that the present invention can be used in association with other types of seat frame members or seat reinforcements, such as a C-shaped member or a U-shaped member. Such other types of members might not have walls which define a closed chamber in the member.

The safety apparatus 10 includes an adjuster 120 for adjusting the position of the retractor 60 relative to the seat frame member 90 and thus relative to the seat sides 26 and 28. The adjuster 120 includes a screw 122 supported for rotation on the seat frame member 90. The screw 122 extends through the chamber 102 in the seat frame member 90 in a horizontal direction parallel to and between the frame member front and back walls 92 and 94. The screw 122 is an elongate member having an externally threaded central portion 124 disposed intermediate smooth opposite end portions 126 and 128.

The smooth end portion 126 of the screw 122 is supported for rotation in a plastic bushing 130 received in the side wall 98 of the seat frame member 90. The smooth end portion 128 of the screw 122 is supported for rotation in a plastic bushing 132 received in the side wall 100 of the seat frame member 90. A cotter pin 133 or other suitable retainer inserted through the smooth end portion 126 of the screw 122 blocks axial movement of the screw relative to the seat frame member 90.

The screw 122 is rotatable about its longitudinal central axis 134, which extends parallel to the axis 82 about which the retractor spool 76 rotates. The axis 134 extends in a horizontal direction between the sides 26 and 28 of the vehicle seat back 20.

The adjuster 120 includes a manually engageable rotatable knob 136 fixed for rotation with the screw 122. The knob 136 is disposed outside of the seat frame member 90, i.e., not within the chamber 102. Also, the knob 136 is disposed outside of the seat back cover 30, i.e., not within the seat back 20 itself.

The adjuster 120 includes a nut 140 which is threadedly engaged with the adjuster screw 122. The nut 140 is a one-piece member having an inner portion 142, a central portion 144, and a threaded outer portion 150. The inner portion 142 is disposed within the chamber 102 in the seat frame member 90 and has an internal thread convolution. The threaded intermediate portion 124 of the screw 122 is threadedly received in the nut inner portion 142, so that rotation of the screw 122 effects movement of the nut 140 along the screw. The threads of the screw 122 and of the nut 140 may be of any type but preferably are Acme type threads.

The central portion 144 of the nut 140 extends from the inner portion 142 through the slot 96 in the back wall 94 of the seat frame member 90. The central portion 144 also extends through the mounting opening 66 in the retractor frame back wall 64. The externally threaded outer portion 150 of the nut 140 extends from the central portion 144 and is disposed outside of the seat frame member 90. A threaded fastener 154 is received on the outer portion 150 of the nut 140. Alternate attachment means, such as a push nut, could be used in place of the threaded fastener 154.

A washer 146 is mounted on the central portion 144 of the nut 140 and separates the inner portion 142 of the nut from an inner major side surface 148 of the seat frame member back wall 94. The washer 146 facilitates sliding movement between the nut 140 and the back wall 94 of the frame member 90. The retractor frame back wall 64 is in slidable abutting engagement with the outer major side surface of the seat frame member back wall 94. A second plastic washer 156 is mounted on the central portion 144 of the nut 140 between the retractor frame back wall 64 and the fastener 154. The fastener 154 secures the retractor frame back wall 64, and thus the retractor 60, for movement with the nut 140.

The adjuster knob 136 is manually engageable and rotatable by an occupant of the vehicle in which the seat 12 is located. As the knob 136 is rotated, the screw 122 rotates about the axis 134. As the screw 122 rotates, the nut 140, which is threadedly engaged with the screw, moves relative to the screw. The nut 140 moves along the screw 122 in a direction between the seat frame member side walls 98 and 100. The movement of the nut 140 is in a direction parallel to the axis 134 and parallel to the axis 82.

As the nut 140 moves, the retractor 60 moves with the nut 140 relative to the seat frame member 90 and relative to the seat 12. As the retractor 60 moves, the lower surface 74 of the retractor frame transverse wall 72 slides along the upper surface 106 of the seat frame member upper wall 104. Also, the retractor frame back wall 64 slides along the seat frame member back wall 94.

The retractor spool 76 moves with the retractor 60 relative to the seat 12. As the retractor spool 76 moves, the shoulder belt portion 48 of the belt webbing 42 moves along the length of the cover slot 32 and thus extends from the vehicle seat back 20 at different locations, to accommodate vehicle occupants of different sizes.

This movement of the belt webbing 42 can be seen in a comparison of FIG. 1 and FIG. 1A. The retractor 60 is illustrated in FIG. 1 in a first position at or near its outboard limit of movement relative to the vehicle seat back sides 26 and 28, that is, in a direction toward the outboard side 26 of the vehicle seat back 20. When the retractor 60 is in this position, the shoulder portion 48 of the belt webbing 42 extends from the seat cover slot 32 at a first location adjacent the end 34 of the slot.

FIG. 1A illustrates the retractor 60 in a position disposed at or near its inboard limit of movement relative to the vehicle seat back sides 26 and 28. When the retractor 60 is in this position, the shoulder portion 48 of the belt webbing 42 extends through the slot 32 at a second location near the end 36 of the slot.

Thus, the safety apparatus 10 can accommodate vehicle occupants of different sizes, by horizontally moving the point from which the shoulder belt portion 48 extends out of the seat back 20 and across the occupant's torso toward the buckle 50. A vehicle occupant can rotate the knob 136 to adjust the exit point of the belt webbing 42 from the cover slot 32, within the range of movement of the retractor 60, to an optimum position for occupant comfort.

In the preferred embodiment, the seat belt webbing engaging member such as the retractor 60 has a range of movement which is at least partially in a direction from side to side in the vehicle. This enables appropriate adjustment of the shoulder belt portion 48 relative to the torso of a vehicle occupant seated in the seat 12. It should be understood that the term "horizontal" is used herein to refer to a typical orientation in a vehicle of a safety apparatus such as the safety apparatus 10.

Depending on the seat configuration and its mounting, and depending on the placement and mounting of the belt webbing engaging member within the seat, the slot 32 and the axes 82 and 134 may not extend horizontally.

Specifically, the slot 32 and the axes 82 and 134 may extend at an angle to the horizontal and thus incorporate a component of vertical movement into the movement of the retractor 60. In addition, the retractor 60 or other seat belt webbing engaging member could be mounted for separate vertical movement, as well as for horizontal movement. Such separate vertical and horizontal movements would require an additional adjuster and an intermediate mounting member to permit vertical adjustment of the retractor 60. It is intended that the present invention include safety apparatus having parts disposed in such other orientations.

A belt webbing engaging member in accordance with the present invention engages and guides the movement of belt webbing as it exits or extends from the vehicle seat back. The retractor spool 76 includes at its axial ends a pair of circular radially extending side flanges (best seen in FIGS. 1A and 2) which are spaced apart and between which the belt webbing 42 extends. The spool 76 and the flanges of the spool position the belt webbing 42 laterally and thus guide the belt webbing 42 as it exits the vehicle seat back 20. The retractor spool 76 thus functions as a belt guide.

In accordance with the present invention, a belt webbing engaging member, or belt guide, could be a device other than a rotatable retractor spool having belt webbing wound thereon. For example, a retractor with a rotatable retractor spool for the belt webbing 42 could be located elsewhere in the seat 12, such as in the seat bottom cushion 14 or in the lower portion 22 of the vehicle seat back 20. Belt webbing would extend upward from the retractor, through the vehicle seat back 20, to a belt guide which is mounted at the illustrated location of the retractor spool 76. The belt webbing would pass over the belt guide and exit from the vehicle seat back 20 at the location illustrated in FIGS. 1 and 1A.

In such a case, the belt guide could be a member, such as a spool of the type used in a retractor but without the other retractor parts, having a curved surface over which the seat belt would move. The member could have associated flanges for constraining the side edges of the belt. The member would preferably be mounted in a rotatable or non-rotatable manner within the vehicle seat back, and would be movable relative to the seat back like the retractor spool 76. An adjusting screw such as the adjusting screw 122 could extend axially through the member and be threadedly engaged with the member. Rotation of the adjusting screw would result in axial movement of the member.

A safety apparatus in accordance with the present invention may include a power drive mechanism for moving the retractor 60 or other seat belt webbing engaging member. For example, manual rotation of the knob 136 may result in actuation of an electric motor or other device to rotate the screw 122 and thus move the seat belt webbing engaging member axially. Alternatively, a directional switch or other type of control member may replace the knob 136 for actuation of any suitable type of power drive mechanism.

From the above description of the invention, those skilled in the art will perceive improvements, changes, and modifications in the invention. Such improvements, changes, and modifications within the skill of the art are intended to be covered by the appended claims.

Having described the invention, I claim:

1. A vehicle safety apparatus comprising:

a seat for an occupant of a vehicle, said seat including a seat back, a seat cover covering said seat back, and an elongate opening in said seat cover on said seat back, said opening having first and second opposite ends;

a belt webbing engaging member;

a length of belt webbing extensible from said belt webbing engaging member about the occupant of the vehicle seat to restrain the occupant, said belt webbing comprising a torso portion extending from said belt webbing engaging member out of said seat back through said opening in said seat cover, said belt webbing having a width which is less than the length of said opening, said belt webbing being movable in a first direction into and out of said seat back through said opening in said seat cover to extend said belt webbing around the vehicle occupant;

means for supporting said belt webbing engaging member for movement in said seat back inside said seat cover in a second direction along the length of said opening between said first and second opposite ends of said opening, said second direction extending generally transverse to the length of said torso portion of said belt webbing and generally transverse to said first direction; and manually actuatable adjusting means for driving said belt webbing engaging member for movement in said second direction to move said torso portion of said belt webbing along the length of said opening in said seat cover between a first position in which said torso portion extends through said opening at a first location adjacent to said first end of said opening in said seat cover and a second position in which said torso portion extends through said opening at a second location spaced from said first location and adjacent to said second end of said opening in said seat cover.

2. A vehicle safety apparatus as set forth in claim 1 wherein said belt webbing engaging member comprises a retractor spool which is supported for rotation about a first axis, said first axis extending generally parallel to said second direction, said retractor spool including at its axial ends a pair of circular radially extending side flanges which are spaced apart and between which said belt webbing extends, said retractor spool and said flanges positioning said belt webbing as said belt webbing engaging member moves in said second direction and guiding said belt webbing as said belt webbing moves through said opening in said first direction.

3. An apparatus as set forth in claim 2 comprising a retractor frame supporting said retractor spool for rotation relative to said retractor frame, said retractor frame including a back wall, opposed and spaced apart side walls extending perpendicularly from said back wall, and a transverse wall extending between said side walls and perpendicular to said back wall;

said seat back including a seat frame member which is fixed in position in said seat back, said retractor spool moving relative to the seat frame member and relative to the seat back upon movement of said retractor spool in said second direction, said transverse wall of said retractor frame sliding along said seat frame member, said retractor frame back wall sliding along a back wall of said seat frame member.

4. An apparatus as set forth in claim 2 wherein said means for supporting said belt webbing engaging member comprises a screw rotatable about a second axis extending generally parallel to said first axis and a nut connected for movement with said retractor spool in said second direction.

5. An apparatus as set forth in claim 2 wherein said seat back has an outboard side and an inboard side, said first axis extending generally horizontally in a direction between said inboard side of said seat back and said outboard side of said seat back.

6. An apparatus as set forth in claim 5 including means for mounting said retractor spool for separate vertical movement as well as for horizontal movement, said means for mounting including a second adjusting means including an intermediate mounting member to permit vertical adjustment of said retractor spool.

7. An apparatus as set forth in claim 1 wherein said opening extends at an angle to the horizontal, said belt webbing engaging member moving at least partially vertically during the movement of said belt webbing engaging member in said second direction.

8. An apparatus as set forth in claim 1 wherein said means for supporting said belt webbing engaging member comprises interengaging relatively movable first and second threaded members, one of said first and second threaded members being movable with said belt webbing engaging member relative to said seat upon relative movement between said first and second threaded members.

9. A vehicle safety apparatus comprising:
a seat for an occupant of a vehicle, said seat including a seat back, a seat cover covering said seat back, and an elongate opening in said seat cover on said seat back;
a seat belt webbing retractor spool;
means for supporting said retractor spool in said seat back inside said seat cover for rotation about a first axis;
a length of seat belt webbing extensible from said retractor spool about the occupant of the vehicle seat to restrain the occupant, said belt webbing comprising a torso portion extending from said retractor spool out of said seat back through said opening in said seat cover, said belt webbing having a width which is less than the length of said opening;
said retractor spool including at its axial ends a pair of circular radially extending side flanges which are spaced apart and between which said belt webbing extends;
means for supporting said retractor spool in said seat back for movement in said seat back in a first direction parallel to said first axis and along the length of said opening; and
manually actuatable adjusting means for driving said retractor spool for movement in said first direction to move said torso portion of said belt webbing along the length of said opening between a first position in which said torso portion extends through said opening at a first location and a second position in which said torso portion extends through said opening at a second location spaced from said first location;
said retractor spool and said flanges positioning and guiding said belt webbing laterally as it extends through said opening and exits said vehicle seat back.

10. An apparatus as set forth in claim 9 wherein said seat back has an outboard side and an inboard side, said first axis extending generally horizontally in a direction between said inboard side of said seat back and said outboard side of said seat back.

11. An apparatus as set forth in claim 10 including means for mounting said retractor spool for separate vertical movement as well as for horizontal movement, said means for mounting including a second adjusting means including an intermediate mounting member to permit vertical adjustment of said retractor spool.

12. An apparatus as set forth in claim 10 comprising a retractor frame supporting said retractor spool for rotation relative to said retractor frame, said retractor frame including a back wall, opposed and spaced apart side walls extending perpendicularly from said back wall, and a transverse wall extending between said side walls and perpendicular to said back wall, said transverse wall having a lower surface;

said seat back including a seat frame member which is fixed in position in said seat back, said retractor spool moving relative to the seat frame member and relative to the seat back, said lower surface of said retractor frame transverse wall sliding along an upper surface of said seat frame member, said retractor frame back wall sliding along a back wall of said seat frame member.

13. An apparatus as set forth in claim 9 wherein said opening and said first axis extend at an angle to the horizontal, said retractor spool thereby moving at least partially vertically during the movement of said retractor spool in said first direction.

* * * * *